United States Patent [19]

Kiziltug

[11] Patent Number: 5,072,600
[45] Date of Patent: Dec. 17, 1991

[54] WASH COLUMN ICE-PACK BOTTOM DETECTION DEVICE

[75] Inventor: Arif Y. Kiziltug, Naperville, Ill.

[73] Assignee: Chicago Bridge & Iron Technical Services, Oak Brook, Ill.

[21] Appl. No.: 622,006

[22] Filed: Dec. 4, 1990

[51] Int. Cl.⁵ .......................... B01D 9/04; G01F 23/30
[52] U.S. Cl. ........................ 62/540; 62/188; 73/321; 137/412
[58] Field of Search ............. 62/540, 123, 124, 188; 137/412; 73/321

[56] References Cited

U.S. PATENT DOCUMENTS

| | | | |
|---|---|---|---|
| 2,683,372 | 7/1954 | Borden | 73/321 |
| 2,942,468 | 6/1960 | Leduc | 73/321 |
| 3,501,924 | 3/1970 | Ashley | 62/123 |
| 3,620,034 | 11/1971 | Ganiaris | 62/58 |
| 3,664,145 | 5/1972 | Johnson | 62/58 |
| 4,091,635 | 5/1978 | Ogman | 62/123 |
| 4,286,436 | 9/1981 | Engdahl et al. | 62/123 |
| 4,314,455 | 2/1982 | Engdahl | 62/124 |
| 4,341,085 | 7/1982 | Nail | 62/124 |
| 4,517,806 | 5/1985 | Korzonas | 62/123 |

FOREIGN PATENT DOCUMENTS 312051 7/1930 United Kingdom ............... 73/321

Primary Examiner—William E. Wayner
Attorney, Agent, or Firm—Marshall, O'Toole, Gerstein, Murray & Bicknell

[57] ABSTRACT

Apparatus comprising a vessel capable of receiving a variable supply of an aqueous ice slurry in which an upper packed ice bed can float on an aqueous volume; a hollow conduit having a first end located in the lower internal space of the vessel and a second end located exterior of the vessel; a float positioned in the vessel lower internal space; and a movable line in the hollow conduit joined at one end to the float, and the line second end extending out of the conduit second end thus permitting it to be displaced to indicate the position of the float, and thus the bottom of the packed ice bed, when it contacts a packed ice bed bottom.

15 Claims, 1 Drawing Sheet

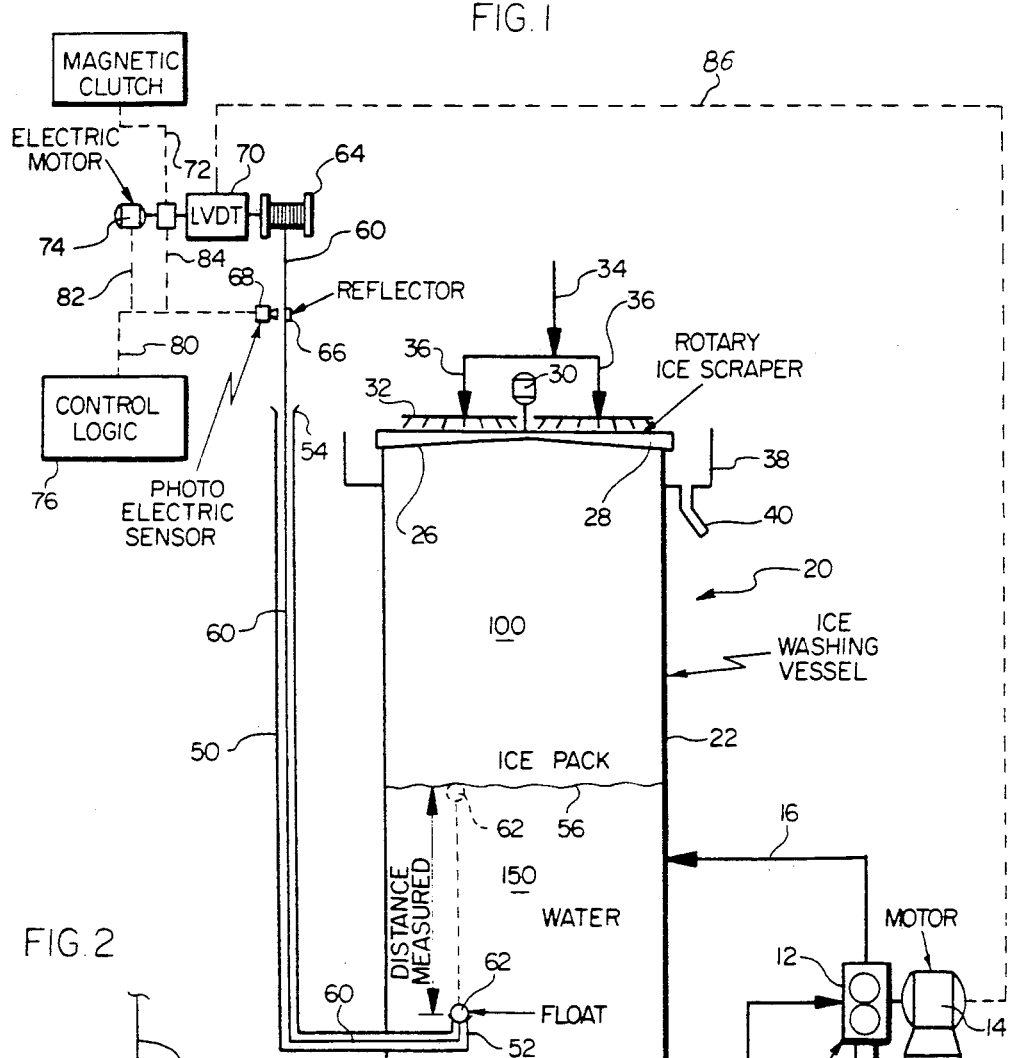
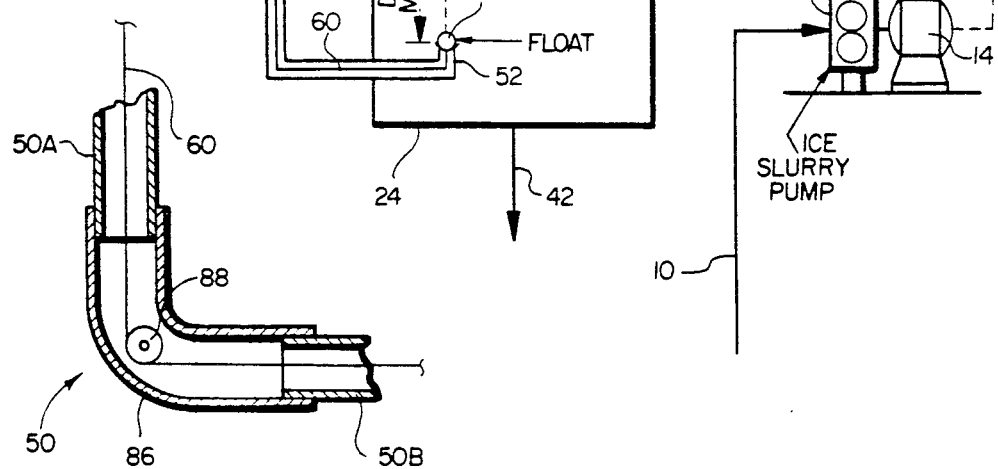

WASH COLUMN ICE-PACK BOTTOM DETECTION DEVICE

This invention relates to apparatus for separating and washing ice formed in producing potable water from brackish water and seawater, and in concentrating aqueous products by removing water as ice. More particularly, this invention is concerned with apparatus and methods for determining the location of the bottom of an ice pack in an ice separating and washing vessel.

BACKGROUND OF THE INVENTION

Various freeze processes and apparatus have been developed to produce potable water from seawater or brackish water; to concentrate fruit juices such as orange juice, grape juice and apple juice, vegetable juices such as tomato juice, and coffee; and to separate dissolved or suspended solids from a liquid carrier. See, for example, Engdahl et al U.S. Pat. Nos. 4,286,436; Ashley 3,501,924; Ganiaris 3,620,034; Johnson 3,664,145 and Ogman 4,091,635.

After an ice slurry has been produced, it is usually desirable to separate the ice from the liquid and to wash it with pure water. When potable water is being produced from seawater or brackish water, the washing is necessary to remove salt water solution residues from the ice surfaces. In the concentration of various products, such as a fruit juice, the ice is washed to recover any juice residue clinging to the ice crystals.

Apparatus for separating an ice slurry and washing the ice for the described purposes has been known in the art for a considerable amount of time. One type of such apparatus includes a vessel having a bottom and cylindrical wall with an open top. Vertical tubes with perforations in their upper portions are positioned in the vessel. An ice slurry fed to the vessel separates into a pack of ice floating on concentrated liquid. The concentrated liquid flows through the tube perforations and is collected if the liquid is a desirable product, such as a juice, drained off to waste or recycled in the process. Pure water is sprayed onto the top of the ice pack to wash it clean. As the washed ice pack rises above the vessel top edge it is scraped off and collected. Melting the washed ice yields potable water. If potable water is not the desired product, such as in a juice concentration process, the ice can be melted for recovery of refrigeration or it can be discarded. An apparatus of the described type and its operation are disclosed in U.S. Pat. Nos. 4,341,085 and 4,517,806.

When a slurry is fed to the ice separating and washing vessel, a pressure force is created in the vessel which drives the crystal pack upwardly due to upward flow of the concentrated liquid through the forming ice crystal pack. As the total liquid flow or ice crystal fraction changes, the concentrated liquid flow is affected. At times this creates a condition where the driving force increases while crystal pack formation is slowed. As a result, the crystal pack formation zone moves, causing variations in crystal pack density, porosity and draining characteristics.

In order to obtain ice pack washing uniformity, it is desirable for the ice pack to have a height within a predetermined rather narrow range. This requires that the location of the ice pack bottom surface be known so that the rate at which ice slurry fed to the vessel can be regulated so as to approximately balance the amount of ice fed to the wash vessel with the amount of washed ice removed therefrom and also to coordinate removal of excess concentrated liquid from the vessel.

SUMMARY OF THE INVENTION

The invention provides apparatus comprising a vessel capable of receiving a variable supply of an aqueous ice slurry in which an upper packed ice bed can float on an aqueous volume; a hollow conduit having a first end located in the lower internal space of the vessel and a second end located exterior of the vessel; a float positioned in the vessel lower internal space; and a movable line in the hollow conduit joined at one end to the float, and the line second end extending out of the conduit second end thus permitting it to be displaced to indicate the position of the float, and thus the bottom of the packed ice bed, when it contacts a packed ice bed bottom.

The second end of the line can be operably joined to a linear variable displacement transducer which provides a signal proportional to movement of the line with displacement of the float between a predetermined lower position and contact with the bottom of the packed ice bed.

An ice slurry supply conduit having a pump therein can communicate with the vessel lower internal space and means can communicate a signal from the transducer to the pump to control the pump operation and thus the amount of ice slurry fed to the vessel to regulate the volume of the packed ice bed in the vessel.

Means external of the vessel can pull down the float from contact with the ice pack bottom to a standby position near the conduit lower end by displacing the line in the conduit to an effectively shortened length and means can be used to periodically pay out the shortened line to increase its length and thus permit the float to rise from standby position into contact with the packed ice bed bottom.

The line can be attached to a rotatable spool and the spool can be driven by a motor. Photoelectric means can be used to stop the motor when the float reaches the standby position. An electrically energized clutch can be located between the motor and the spool and means provided to de-energize the clutch at set intervals so that the line can be freely unwound from the spool and the float allowed to rise up to the packed ice bed bottom.

The invention also provides a method of determining the bottom of a packed ice bed in a vessel comprising positioning a hollow conduit having a first end located in a lower internal space of the vessel and a second end located exterior of the vessel; positioning a float in the vessel lower internal space; positioning a line in the hollow conduit; connecting one end of the line to the float; locating a second end of the line out of the conduit; pulling the second end of the line until the float is lowered to a predetermined bottom position; releasing the line so that the float buoyancy can cause it to rise until it contacts the bottom of the packed ice bed; and measuring the distance the line is displaced between the two said float positions to determine the location of the packed ice bed bottom.

BRIEF DESCRIPTION OF THE DRAWINGS

FIG. 1 illustrates schematically one embodiment of apparatus provided by the invention; and FIG. 2 is a sectional view of a pipe or tube elbow fitting containing a pulley over which a line can run.

DETAILED DESCRIPTION OF THE DRAWINGS

With reference to FIG. 1 the ice washing vessel or column 20 has a cylindrical circular vertical wall 22, a bottom 24 and an open top 26. Such vessels are disclosed in Nail U.S. Pat. 4,341,085 and Engdahl U.S. Pat. No. 4,314,455.

An ice slurry, from any appropriate source, is fed by conduit 10 to pump 12 driven by motor 14. The ice slurry is fed from pump 12 to conduit 16 which delivers it to the bottom portion of vessel 22 wherein the ice is separated from the liquid. The ice crystals, being more buoyant than the liquid, rise to the top of the vessel. The fraction of ice in the slurry within the vessel 20 increases towards the top and eventually forms a packed ice bed 100 with a thin layer of liquid adhering to the ice crystals. The packed ice bed moves slowly upward in wash vessel 20 as a result of hydraulic force and the buoyancy of the ice. As the bed rises it becomes uniform in composition and evenly packed above a volume of water 150.

A rotary horizontally positioned ice scraper blade 28 is axially positioned close to the open top 26 of vessel 20. The ice scraper blade 28 is driven about a vertical axis by motor 30. Also located above the vessel open top 26 is a spray head 32 to which water is supplied by conduits 34,36. Water is sprayed onto the top of the ice bed or pack in vessel 20 to wash off impurities, or to remove a juice or other material being concentrated. The rotating blade 28 scrapes the ice bed as it rises above the rim of the open top 26 of vessel 20. The harvested ice slush drops into trough 38 located outside of and slightly below the vessel open top 26. The ice can be melted in the trough and the cold water then drained off through conduit 40. Excess water in vessel 20 is withdrawn through conduit 42 located in the vessel bottom 24.

Hollow conduit 50 has an open lower or first end 52 located in the lower internal space of vessel 20 and an open upper or second end 54 located external of the vessel. The upper end 54 can be located at, or above or below, a predetermined top surface of the packed ice bed in vessel 20. The lower end 52 is located substantially below the bottom surface 56 of the ice pack.

A movable line 60, which can be a wire, rope or band, metallic or nonmetallic, extends through conduit 50. The lower end of line 60 is joined to float 62 and the second end of line 60 is joined to a spool 64 on which line 60 can be wound and unwound from it. The float is desirably positioned in the vessel lower internal space below a predetermined bottom of the packed ice bed. When so positioned the line is in tension due to the buoyancy of the float. This tension is easily felt manually. A reflector 66 is secured onto movable line 60 and a photoelectric sensor 68 is stationarily mounted opposite the reflector 66.

A linear variable displacement transducer (LVDT) 70 is operably connected to spool 64. The LVDT 70 is also operably connected to a magnetic clutch 72 which is engaged by motor 74. A microprocessor 76 having appropriate control logic for the system is included. Electric signal line 80 interconnects the photoelectric sensor 68 and microprocessor 76. Electric signal lines 82,84 interconnect the electric motor 74 and magnetic clutch 72 respectively with electric line 80. Additionally, an electric signal line 86 interconnects LVDT 70 with motor 14.

When the float 62 is in its lower most position on top of the lower end 52 of conduit 50 the reflector 66 is opposite photoelectric sensor 68. Releasing of the float 62 is achieved by de-energizing the clutch 72 between motor 74 and the LVDT 70 and spool 64. A timer, not shown can be used to set the time interval between the releases.

The float 62 released from the bottom of the vessel 20 stops when it hits the bottom 56 of the packed ice bed and thereby eliminates tension on the line, which can be easily felt manually if automatic measuring means is not used. The length of line 60 released determines the distance between the lower most position of the float and the bottom 56 of the ice pack 100. The amount of line 60 unwound or paid out from spool 64 is tied to LVDT 70 which outputs a signal proportional to the length of unwound line 60. After the distance measurement is made the float is pulled down by winding the line 60 onto spool 64. After the float reaches the lower end 52 of the conduit 50 the motor 74 is stopped by the signal from photoelectric sensor 68 which detects the location of the float by means of reflector 66. The signal from the LVDT 70 is used to set the speed of slurry pump 12 which regulates the rising speed of the packed ice bed 100. All of the described operations can be controlled by micropressor 76, which can incorporate a timer to regulate release and return of the float.

It should be appreciated that manual measurement of the location of the ice pack bottom 56 can be made by pulling the line 60 upwardly until the float reaches its lower most position. Then the float can be released and allowed to go upwards until it contacts the packed ice bed bottom. The length of line released provides the distance between the two locations of the float and thus the location of the float and thus the position of the packed ice bed bottom. The slurry pump speed can then be increased or decreased to obtain an aqueous ice slurry feed to vessel 20 which equals the amount of ice and water removed therefrom.

FIG. 2 illustrates an arrangement which can be used to bring line 60 around a sharp i.e., 90° turn, such as the two turns in the lower portion of conduit 50 shown in FIG. 1. The turn can be made by use of a 90° elbow 86 in which a small pulley 88 is mounted. Sections of conduit 50A, 50B can then joined to the respective ends of the elbow 86. Line 60 is mounted on the pulley 88 so it can go around the bend or curve with minimum frictional resistance.

Although the above-described apparatus is designed for automatic operation, it is also feasible to determine the location of the packed ice bed bottom by a manual operation. Thus, the line 60 can be detached from spool 64 and the outer end of the line gripped firmly. Then by paying out the line slowly the float 52 will rise from its lowermost position until it contacts the packed ice bed bottom 56. By measuring the length of line paid out the bottom 56 of the bed can be readily determined. The measurement can be double checked by pulling on the line to bring the float down to the bottom of the vessel and measuring the length of line retrieved.

The foregoing detailed description has been given for clearness of understanding only, and no unnecessary limitations should be understood therefrom, as modifications will be obvious to those skilled in the art.

I claim:

1. Apparatus comprising:

a vessel containing a variable amount of an aqueous ice slurry as an upper packed ice bed floating on an aqueous volume;

the vessel having a lower internal space;

a hollow conduit having a first end located in the lower internal space of the vessel and a second end located exterior of the vessel;

a float positioned in the vessel lower internal space; and a movable line in the hollow conduit and extending out of the first end and joined to the float, and the line extending out of the conduit second end thus permitting it to be displaced to indicate the position of the float, and thus the bottom of the packed ice bed, when it contacts the packed ice bed bottom.

2. Apparatus according to claim 1 in which:

the second end of the line is operably joined to a linear variable displacement transducer which provides a signal proportional to movement of the line with displacement of the float between a predetermined lower position and contact with the bottom of the packed ice bed.

3. Apparatus comprising:

a vessel capable of receiving a variable supply of an aqueous ice slurry in which an upper packed ice bed can float on an aqueous volume;

the vessel having a lower internal space;

a hollow conduit having a first end located in the lower internal space of the vessel and a second end located exterior of the vessel;

a float positioned in the vessel lower internal space;

a movable line in the hollow conduit joined at one end to the float, and the line second end extending out of the conduit second end thus permitting it to be displaced to indicate the position of the float, and thus the bottom of the packed ice bed, when it contacts a packed ice bed bottom;

the second end of the line being operably joined to a linear variable displacement transducer which provides a signal proportional to movement of the line with displacement of the float between a predetermined lower position and contact with the bottom of the packed ice bed;

an ice slurry supply conduit having a pump therein and communicating with the vessel lower internal space; and means for communicating the signal from the transducer to the pump for controlling the pump operation and thus the amount of ice slurry fed to the vessel to regulate the volume of the packed ice bed in the vessel.

4. Apparatus according to claim 3 including:

means external of the vessel to pull down the float from contact with the ice pack bottom to a standby position near the conduit lower end by displacing the line in the conduit to an effectively shortened length; and means to periodically pay out the shortened line to increase its length and thus permit the float to rise from standby position into contact with the packed ice bed bottom.

5. Apparatus according to claim 4 in which:

the line is attached to a rotatable spool; and the spool is driven by a motor.

6. Apparatus according to claim 5 including:

photoelectric means to stop the motor when the float reaches the standby position.

7. Apparatus according to claim 6 including:

an electrically energized clutch between the motor and the spool; and means to de-energize the clutch at set intervals so that the line can be freely unwound from the spool and the float allowed to rise up to the packed ice bed bottom.

8. Apparatus comprising:

a vessel containing a variable amount of an aqueous ice slurry as an upper packed ice bed floating on an aqueous volume;

the vessel having a lower internal space;

a hollow conduit having an open lower end located in the lower internal space of the vessel and an open upper end located exterior of the vessel above a predetermined top surface of the packed ice bed;

a float positioned in the vessel lower internal space below a predetermined bottom of the packed ice bed; and a movable line in the hollow conduit and extending out of the first end and joined to the float and at a second end to means which indicates the position of the float, and thus the bottom of the packed ice bed, when it contacts the packed ice bed bottom.

9. Apparatus according to claim 8 in which:

the second end of the line is operably joined to a linear variable displacement transducer which provides a signal proportional to movement of the line with displacement of the float between a predetermined lower position and contact with the bottom of the packed ice bed.

10. Apparatus comprising:

a vessel capable of receiving a variable supply of an aqueous ice slurry in which an upper packed ice bed can float on an aqueous volume;

the vessel having a lower internal space;

a hollow conduit having an open lower end located in the lower internal space of the vessel and an open upper end located exterior of the vessel above a predetermined top surface of the packed ice bed;

a float positioned in the vessel lower internal space below a predetermined bottom of the packed ice bed;

a movable line in the hollow conduit joined at one end to the float and at a second end to means which indicates the position of the float, and thus the bottom of the packed ice bed, when it contacts the packed ice bed bottom;

the second end of the line being operably joined to a linear variable displacement transducer which provides a signal proportional to movement of the lien with displacement of the float between a predetermined lower position and contact with the bottom of the packed ice bed;

an ice slurry supply conduit having a pump therein and communicating with the vessel lower internal space; and means for communicating the signal from the transducer to the pump for controlling the pump operation and thus the amount of ice slurry fed to the vessel to regulate the volume of the packed ice bed in the vessel.

11. Apparatus according to claim 10 including:

means external of the vessel to pull down the float from contact with the packed ice bed bottom to a standby position near the conduit lower end by displacing the line in the conduit to an effectively shortened length; and means to periodically pay out the shortened line to increase its length and thus permit the float to rise from standby position into contact with the packed ice bed bottom.

12. Apparatus according to claim 11 in which:
the line is attached to a rotatable spool in the transducer; and
the spool is driven by a motor.

13. Apparatus according to claim 12 including:
photoelectric means to stop the motor when the float reaches the standby position.

14. Apparatus according to claim 13 including:
an electrically energized clutch between the motor and the spool; and
means to de-energize the clutch at set intervals so that the line can be freely unwound from the spool and the float allowed to rise up to the packed ice bed bottom.

15. A method of determining the location of the bottom of a packed ice bed in a vessel comprising:
positioning a hollow conduit having a first end located in a lower internal space of the vessel and a second end located exterior of the vessel;
positioning a float in the vessel lower internal space;
positioning a line in the hollow conduit;
connecting one end of the line to the float;
locating a second end of the line out of the conduit;
pulling the second end of the line until the float is lowered to a predetermined bottom position;
releasing the line so that the float buoyancy can cause it to rise until it contacts the bottom of the packed ice bed; and
measuring the distance the line is displaced between the two said float positions to determine the location of the packed ice bed bottom.

* * * * *